United States Patent [19]
Frasure

[11] 3,729,135
[45] Apr. 24, 1973

[54] EXPANSION JOINT FOR FLOW SPEED REACTION RAILS

[75] Inventor: James W. Frasure, Houston, Tex.

[73] Assignee: The Dow Chemical Company, Midland, Mich.

[22] Filed: Mar. 9, 1972

[21] Appl. No.: 233,117

[52] U.S. Cl. .................. 238/151, 52/DIG. 5, 94/18, 104/148 LM
[51] Int. Cl. .............................................. E01b 11/00
[58] Field of Search ................. 238/151, 169, 173, 238/228; 104/148 LM; 52/573, DIG. 5; 94/18

[56] References Cited

UNITED STATES PATENTS

| | | | |
|---|---|---|---|
| 442,004 | 2/1890 | Avera | 238/151 |
| 2,444,954 | 7/1948 | Rademaker | 238/151 |
| 3,284,977 | 11/1966 | Lickliter et al. | 52/573 |
| 3,589,089 | 6/1971 | Kedel | 52/DIG. 5 |

Primary Examiner—Robert G. Sheridan
Assistant Examiner—Richard A. Bertsch
Attorney—William M. Yates et al.

[57] ABSTRACT

An expansion joint to connect two rail sections comprising an expansion element with two elongated expandable laminated connectors. The connectors elastically flex upon exertion thereon of generally axially aligned forces. The expansion joint can be enclosed by a suitable cover and side shields and used in mass transport systems.

13 Claims, 4 Drawing Figures

Patented April 24, 1973
3,729,135
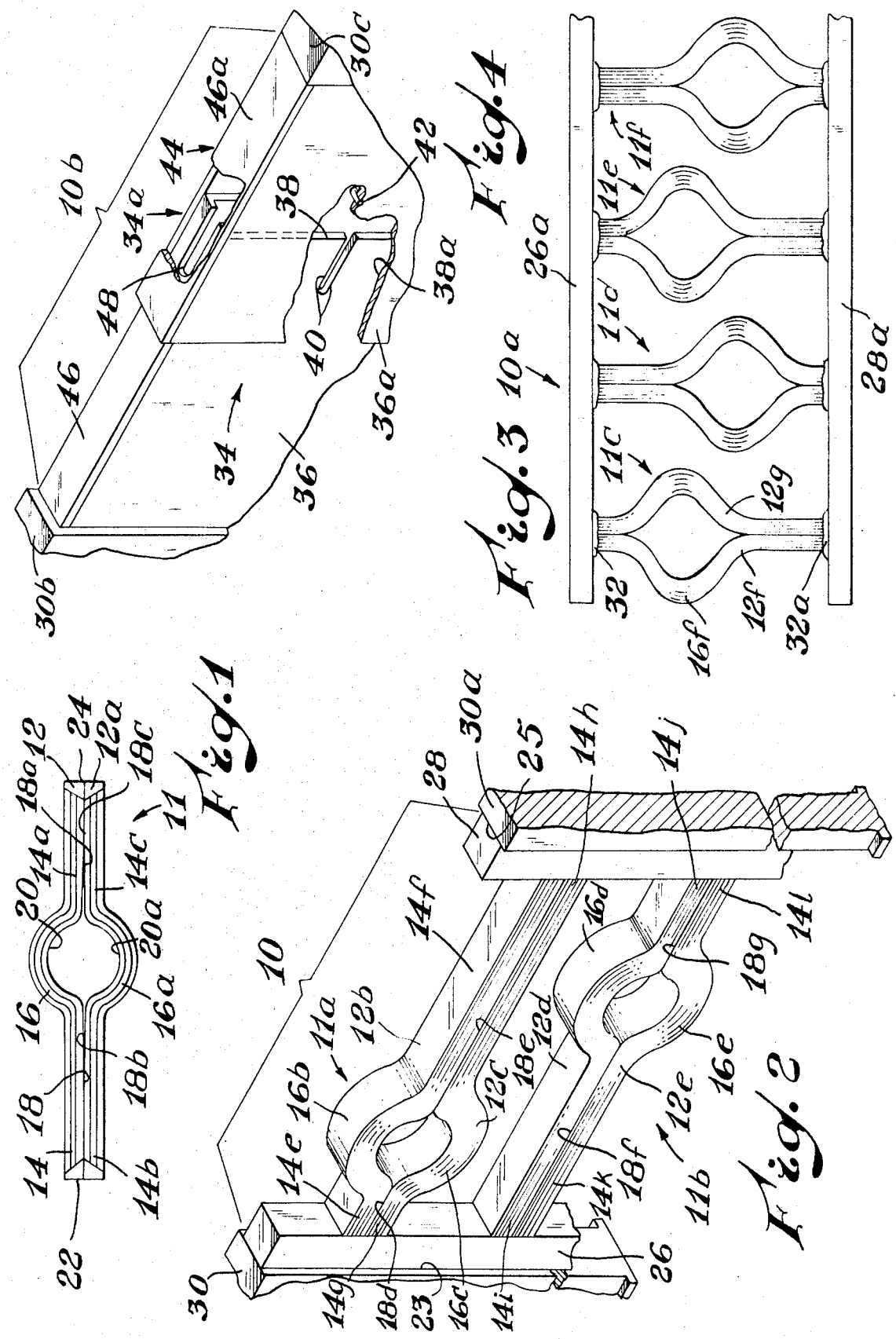

3,729,135

EXPANSION JOINT FOR FLOW SPEED REACTION RAILS

BACKGROUND OF THE INVENTION

This invention pertains to an expandable joint for use in connecting two separate bodies and more particularly relates to an expansion joint for connecting two rail sections in a mass transit system.

Devices of various designs have previously been constructed which will connect at least two separate rails into a single unit. Certain of these devices are capable of expanding and contracting upon changes to the ambient atmosphere surrounding the device. Oftentimes these devices are, for example, cumbersome to install or do not expand sufficiently for the particular application. Of particular need is an improved, compact, readily installed expansion joint which can expand or contract a distance required for a specific application.

It is an object of this invention to provide an improved expansion joint for use in connecting two separate rails.

It is another object of this invention to provide a compact, readily expandable and contractable expansion joint for use in connecting two separate metal rails.

It is a further object of this invention to provide a compact, readily expandable and contractable expansion joint for use in physically and electrically connecting two reaction rail sections of a monorail mass transit system.

Other objects and advantages of this invention will become apparent during the course of the following description.

SUMMARY OF THE INVENTION

An expansion joint has been designed which accomplishes the above described objects and advantages. The expansion joint basically comprises a solid expansion element including a first and a second elongated expandable laminated connector. Each connector has two substantially coplanar portions spaced apart by a convexoconcave portion. The laminae within each connector are suited to slidably and flexibly move in relation to each other, at least at the convexo-concave portion thereof, during deflection of the connector. Preferably the laminae extend substantially the entire length of the connector and are suited to slidably move, relative to each other, over the effective length of the connector. The connectors are further suited to elastically, deflectably contract upon axial exertion theron of coacting compressive forces. Generally the forces exerted are produced by changes in temperature resulting in an axial expansion or contraction of a body or rail to which the expansion joint is attached; however, the described expansion joint is suitable for use when the axial forces are produced by other means. The effective length of the connector is that portion which flexes or bends upon application of the above described forces.

The first and second connectors are suitably positioned and adapted to have a surface of each coplanar portion substantially adjacent to the corresponding coplanar portion of the other connector. The concave surfaces of the convexo-concave portions of the connectors are positioned in substantially opposite directions to each other; that is, the concave surfaces of the first and second connector define a passage therebetween. The described expansion joint has a first and a second end adapted to be removably or preferably permanently attached to separate rails.

The expansion joint is useful for physically connecting together metallic or nonmetallic rails but it is especially useful in connecting linearly aligned metallic rails, which remain in a fixed position and expand and contract upon change in the ambient temperature. The expansion joint is especially useful in physically, electrically connecting two linear electric induction motor reaction rail sections of a mass transportation system.

DESCRIPTION OF THE DRAWING

The accompanying drawing further illustrates the invention:

FIG. 1 is a view of a basic embodiment of the expansion joint;

FIG. 2 is an isometric view of one embodiment of the invention attached to two separate rail sections;

FIG. 3 is a side view of another embodiment of the expansion joint with a plurality of expansion elements;

FIG. 4 is an isometric view of another embodiment of the expansion joint including a side shield and a protective cover.

Identical numerals, distinguished by a letter suffix, within the several figures represent parts having a similar function within the different embodiments.

DESCRIPTION OF THE PREFERRED EMBODIMENTS

In FIG. 1 is depicted a view of an expansion joint comprised of an expansion element 11 including a first and a second connector 12 and 12a, respectively. The first connector 12 has two substantially coplanar portions 14 and 14a spaced apart by a laminated convexoconcave portion 16.

The coplanar portions are in a substantially coplanar mutual relationship when no external forces are applied thereto. The convexo-concave portion 16 can be attached to the coplanar portions 14 and 14a by, for example, soldering, brazing or welding. At least the convexo-concave portion 16 is comprised of laminae such as metal or plastic sheet or film suited to slidably move relative to each other during deflection or bending of the convexo-concave portion 16.

The coplanar portions 14 and 14a have substantially coplanar surfaces 18 and 18a, respectively. The convexo-concave portion 16 has a concave surface 20 positioned between the coplanar surfaces 18 and 18a.

Substantially as described above for the first laminated connector 12, the second laminated connector 12a is comprised of coplanar portions 14b and 14c separated by a laminated convexo-concave portion 16a. The coplanar portions 14b and 14c have substantially coplanar surfaces 18b and 18c, respectively. The convexo-concave portion 16a has a concave surface 20a.

The first and the second connectors 12 and 12a are adapted and suitably positioned to have the surface portions 18 and 18a substantially adjacent and substantially parallel to the surface portions 18b and 18c, respectively. Such surfaces are slightly separated or preferably at least partially in contact with the facing surface portion. The concave surfaces 20 and 20a are suitably positioned substantially opposite in direction to each other to form a passage therebetween.

During operation, the expansion element 11 is physically attached at a first transverse end 22 to a first rail (not shown) and at a second transverse end 24 to a second rail (not shown). Such physical attachment is accomplished by, for example, bolting, brazing, clamping, soldering, and preferably welding.

The isometric view of FIG. 2 is illustrative of a preferred embodiment of an expansion joint 10. This embodiment includes at least two laminated expansion elements 11a and 11b suitably positioned so that coplanar surfaces 18d and 18e of the expansion element 11a are substantially parallel to coplanar surfaces 18f and 18g of the expansion element 11b. The expansion elements 11a and 11b are suitably positioned to be substantially free of mutual contact during compressive bending thereof produced by compressive forces exerted thereon in a substantially axial direction. The axial direction is defined as extending from a first expansion joint transverse end 23 to a second expansion joint transverse end 25 in a direction substantially coincident with the coplanar surfaces 18d and 18e of the expansion element 11a and the coplanar surfaces 18f and 18g of the expansion element 11b.

The expansion elements 11a and 11b include a plurality of substantially parallel laminae within the connectors 12b and 12c of the element 11a and the connectors 12d and 12e of the element 11b. The laminae are adapted to move in relation to each other during bending over substantially the entire length of the spacer. That is, the laminae are free to flexibly move during bending except where the spacers are joined to a first support member 26 and a second support member 28. Such joining or attaching of the expansion elements 11a and 11b to the support members 26 and 28 is by for example bolting, brazing, soldering, and preferably welding.

The support members 26 and 28 are suited to be physically attached to separate rails, such as reaction rails 30 and 30a. Desirably the primary or the most centrally located longitudinal axes of the support members 26 and 28 are substantially parallel to each other; that is, a single plane can simultaneously pass through both axes.

Desirably the expansion elements 11a and 11b and the support members 26 and 28 are constructed of a good electrically conductive material such as copper, a copper alloy, aluminum or an aluminum alloy. The expansion elements 11a and 11b and the support members 26 and 28 are preferably suitably electrically connected to each other and to the rails 30 and 30a to effect substantial coincidence of the axial center line of electric flow through the expansion elements 11a and 11b and the support members 26 and 28 with the axial center line of electric flow through the rails 30 and 30a.

During operation, the rails 30 and 30a are in a stationary position fixed to a base by a clamping means (not shown). The rails 30 and 30a either expand or contract upon exposure to variations in the ambient temperature. Upon contraction of the rails 30 and 30a, tensile stresses are axially exerted upon the expansion joint 10. The tensile forces cause the convexo-concave portions 16b and 16c of the expansion element 11a and also the convexo-concave portions 16d and 16e of the expansion element 11b to move inwardly toward each other, thereby increasing the axial or longitudinal length of the expansion joint 10 to correspond to the amount of linear contraction of the rails 30 and 30a. The expansion joint 10 provides continuous connection between the rails 30 and 30a during contraction of the rails. Conversely, as the ambient temperature increases, the rails 30 and 30a expand and transmit generally axially aligned compressive forces on the expansion elements 11a and 11b. The compressive forces cause a contraction or shortening of the distance between the support members 26 and 28. This contraction is produced by coplanar portions 14e, 14f, 14g, and 14h and the convexo-concave portions 16b and 16c of the expansion element 11a bending or flexibly moving in a substantially opposite outwardly direction from each other; the coplanar portions 14i, 14j, 14k and 14l and the convexo-concave portions 16d and 16e contract in a similar manner. The expansion elements 11a and 11b are suitably positioned to prevent mutual contact between said elements during such bending.

The expansion joint 10 is adapted to afford continuous contact between the rails 30 and 30a over a multiplicity of expansion-contraction cycles. The expansion joint 10 is constructed of materials selected to be compatible with the forces produced during operation and the environment, including temperature, for the desired length of time the expansion joint 10 will be in use. To select the desired material the tensile, compressive, fatigue and the like properties of the material are usually considered.

FIG. 3 is illustrative of an expansion joint 10a with a plurality of substantially uniformly spaced apart expansion elements 11c, 11d, 11e, and 11f. Additional expansion elements of any desired length and width can be employed as described herein. Each expansion element includes two connectors substantially identical to connectors 12f and 12g. Generally it is desirable to have uniform expansion and contraction characteristics throughout the length of the expansion joint 10a, that is, in a direction coincident with the longitudinal axes of the expansion elements 11c, 11d, 11e, and 11f. The individual expansion elements 11d, 11e and 11f and the components thereof are substantially identical to the element 11c. For brevity only the details of the connector 12f of the expansion element 11c will be described, but it is to be understood that the construction of the remaining connectors and expansion elements are substantially identical thereto. The connector 12f is preferably an electric conductor such as an about 99 weight percent pure aluminum alloy; for example, Aluminum Association alloys designated EC or 1100. The connector 12f includes sufficient laminae to carry the desired electric current flow and retain sufficient flexibility to bend the amount necessary to compensate for an expansion or contraction in the rails (not shown) to which support members 26a and 28a are physically, electrically connected by welds 32 and 32a.

In the embodiment of FIG. 3 it is preferred that a plurality of laminae extend the entire length of the connector 12f from the weld 32 to the weld 32a. The laminae are adjacent to and at least partially in physical contact with each other, but are physically attached only at the welds 32 and 32a. The laminae are adapted to slidably move in relation to each other, as required, during bending. Preferably the connector 12f contains at least about 20 laminae about 0.02 inches thick.

The specific curvature of convexo-concave portion 16f of the expansion element 11c can vary, but the depicted configuration of the convexo-concave portion 16f is preferred. The expansion joint 10a is operated substantially as described for the embodiment of FIG. 2.

Oftentimes it is desirable to at least partially enclose the expansion joint during use to, for example, protect it from the environment. An enclosure substantially entirely surrounding the expansion joint is especially preferred when two substantially stationary or fixed linear induction motor reaction rail sections, that is, the linear secondary or rotor of the motor, are joined together. When an air cushion, that is, air pressure supported, mass transit vehicle, such as a train, is used in conjunction with the reaction rail and expansion joint, an enclosed expansion joint assists in maintaining a uniform air pressure between the vehicle and the rail or joint; thereby minimizing vibrations, bumps or jolts transmitted to passengers within the vehicle.

The embodiment of an enclosed expansion joint 10b in FIG. 4 includes the expansion joint 10 or 10a of FIGS. 2 or 3, respectively, enclosed by two side shields 34 and 34a spaced apart by the expansion elements (not shown) and the support members (not shown) of the expansion joint. The side shields 34 and 34a are preferably suitably positioned to be substantially free of physical contact with the expansion elements during operation. Since the side shields 34 and 34a are of a similar design, only side shield 34 will be described herein. The side shield 34 includes at least a first and a second substantially parallel planar shield section 36 and 36a, respectively, adapted to cooperatively move or slide in relation to each other without binding or jamming. The shield sections 36 and 36a have longitudinal surface portions 38 and 38a, respectively, substantially adjacent to each other.

The shield sections 36 and 36a are attached to the support members (not shown) or, optionally, to rails 30b and 30c by means such as bolting, clamping, brazing, soldering, or preferably welding.

The shield section 36 preferably has an aligning means such as a surface 40 defining a aligning slot suitable to receive at least one aligning pin 42 during expansion or contraction of the expansion joint. A plurality of such aligning pins and slots can be employed if desired.

A planar cover 44 is positioned with a longitudinal plane thereof substantially perpendicular to a longitudinal plane of the shield sections and is preferably spaced sufficiently apart from the expansion elements to prevent mutual physical contact between the expansion elements and the cover 44 during operation. The protective cover 44 includes at least a first and a second substantially parallel cover elements 46 and 46a attached to the support members (not shown) or, optionally, the rails 30b and 30c by means described for the side shields 34 and 34a. If desired, the abutting shield sections and cover elements can be a single, shaped piece of material or individual parts physically attached to each other by hereinbefore described means.

The cover element 46 can have a surface 48 to define an aligning slot. In combination with the aligning slot, the cover element 46a has at least one aligning pin (not shown) adapted to cooperatively, slidably fit within the aligning slot during contraction and expansion of the rails 30b and 30c.

The device of the present invention is susceptible of being embodied with various alterations and modifications, which may differ from those described herein before. For this reason, it is to be fully understood that all of the foregoing is intended to be illustrative and not to be construed or interpreted as being restrictive or otherwise limiting the present invention.

What is claimed is:

1. An expansion joint for use in connecting two rails comprising an expansion element with a first and a second elongated expandable laminated connector, each connector having two substantially coplanar portions spaced apart by a convexo-concave portion, said connectors suited to elastically deflectably expand upon axial exertion of coacting tensile forces and to elastically deflectably contract upon axial exertion of coacting compressive forces, the laminae suited to slidably move relative to each other, at least at the convexo-concave portions thereof, during deflection; the first connector adapted to have a surface of each coplanar portion substantially adjacent to the corresponding surface of said second connector and the concave surface of the convexo-concave portion substantially opposite in direction to the corresponding concave surface of said second connector.

2. The expansion joint of claim 1 including a first support member attached to a first transverse end of said expansion element and a second support member attached to a second transverse end of said expansion element, said first and second support members suited to be physically attached to separate rails.

3. The expansion joint of claim 2 including at least two expansion elements suitably positioned to effect substantial parallelism of the coplanar surfaces and substantial freedon of mutual contact between said expansion elements during compressive bending.

4. The expansion of joint of claim 3 including a plurality of cooperative expansion elements with the convexo-concave portions of each expansion element adapted to be substantially free of contact with the other expansion elements during compressive bending.

5. The expansion joint of claim 3 wherein the primary longitudinal axes of said support members are substantially parallel to each other and said expansion elements are each attached at the first transverse end and the second transverse end to a longitudinal surface of said support members; and two side shields are spaced apart at least by said expansion elements, each of said shields comprising at least two substantially parallel planar shield sections, a first shield section attached to a longitudinal surface of said first support member and a second shield section attached to a longitudinal surface of said second support member, said first and second shield sections adapted to be in cooperative slidable relationship with each other and have at least a longitudinal surface portion thereof substantially adjacent to each other.

6. The expansion joint of claim 5 including a planar protective cover suitablly positioned with a longitudinal plane thereof substantially perpendicular to a longitudinal plane of said shield sections and spaced apart from said expansion elements, said cover comprising at least two substantially parallel cover elements, a first cover element attached to a surface of said first support member and a second cover element attached to a surface of said second support member, said first and second cover elements adapated to be in cooperative slidable relationship with each other and have at least a longitudinal surface portion thereof substantially adjacent to each other.

7. The expansion joint of claim 2 wherein said connector and said support members are electric conductors.

8. The expansion joint of claim 7 wherein said expansion elements and said support members are suitably electrically connected to each other and to the first rail and to the second rail and suitably positioned to effect substantial coincidence of the axial centerline of electric current flow through said expansion elements and said support members with the axial centerline of electric current flow through the rails.

9. The expansion joint of claim 2 wherein said connector and said end members are an aluminum alloy.

10. The expansion joint of claim 1 wherein said connector contains a plurality of laminae.

11. The expansion joint of claim 1 wherein said connector contains at least 20 laminae.

12. In combination with a linear induction motor reaction rail of an air cushion supported mass transit system vehicle the improvement comprising the expansion joint of Claim 6 for use in physically, electrically connecting two linear induction motor reaction rail sections wherein said expansion spacers and said support members are electric conductors and are suitably electrically connected to each other and to the first and the second rail sections and suitably positioned to effect substantial coincidence of the axial center line of electric current flow through said expansion elements and said support members with the axial center line of electric current flow through the rail sections.

13. The expansion joint of claim 12 wherein the exterior portions of said side shields and said protective cover are adapted to be in a substantially planar relationship with the corresponding parallel portions of the rails.

* * * * *